(12) United States Patent
Tang (10) Patent No.: US 7,460,748 B2
(45) Date of Patent: Dec. 2, 2008

(54) LENSED TIP OPTICAL FIBER AND METHOD OF MAKING THE SAME

(76) Inventor: Yin S. Tang, 201 Rockview, Irvine, CA (US) 92612

( * ) Notice: Subject to any disclaimer, the term of this patent is extended or adjusted under 35 U.S.C. 154(b) by 218 days.

(21) Appl. No.: 10/799,483

(22) Filed: Mar. 12, 2004

(65) Prior Publication Data
US 2005/0150255 A1    Jul. 14, 2005

Related U.S. Application Data

(63) Continuation-in-part of application No. 10/786,766, filed on Feb. 24, 2004, now Pat. No. 7,004,811, and a continuation-in-part of application No. 10/775,793, filed on Feb. 9, 2004, now Pat. No. 6,950,237, and a continuation-in-part of application No. 10/754,365, filed on Jan. 8, 2004, now Pat. No. 6,950,239.

(51) Int. Cl.
G02B 6/00    (2006.01)
G02B 6/10    (2006.01)
G02B 6/26    (2006.01)
G02B 6/32    (2006.01)
G02B 6/42    (2006.01)
C03B 37/00   (2006.01)
C03B 37/023  (2006.01)
H01L 21/00   (2006.01)
B29D 11/00   (2006.01)

(52) U.S. Cl. .............................. 385/33; 385/35; 65/385; 65/387; 438/31; 264/1.24; 264/1.25; 264/1.26

(58) Field of Classification Search .................. 385/33, 385/35; 65/385, 387; 438/31; 264/1.24, 264/1.25, 1.26
See application file for complete search history.

(56) References Cited

U.S. PATENT DOCUMENTS

| | | | | |
|---|---|---|---|---|
| 4,589,897 A | * | 5/1986 | Mathyssek et al. | 65/433 |
| 5,037,174 A | * | 8/1991 | Thompson | 385/33 |
| 5,459,803 A | * | 10/1995 | Yamane et al. | 385/33 |
| 5,565,978 A | * | 10/1996 | Okubo et al. | 356/128 |
| 6,375,651 B2 | * | 4/2002 | Grasso et al. | 606/15 |
| 2003/0029040 A1 | * | 2/2003 | Cesaroni et al. | 29/890.046 |
| 2004/0134884 A1 | * | 7/2004 | Wei et al. | 216/83 |

* cited by examiner

Primary Examiner—Frank G Font
Assistant Examiner—Jerry Blevins (57) ABSTRACT

A method provided for manufacturing a lensed tip optical fiber. The method includes providing an optically transparent cylindrical fiber; and etching a first end of the optically transparent cylindrical fiber to form a tip. The tip is heated which forms a lens surface at the heated tip.

21 Claims, 6 Drawing Sheets

LENSED TIP OPTICAL FIBER AND METHOD OF MAKING THE SAME

This application is a continuation-in-part of application Ser. No. 10/754,365, filed Jan. 8, 2004 now U.S. Pat. No. 6,950,239, a continuation-in-part of application Ser. No. 10/775,793, filed Feb. 9, 2004 now U.S. Pat. No. 6,950,237, and a continuation-in-part of application Ser. No. 10/786,766, filed Feb. 24, 2004 now U.S. Pat. No. 7,004,811, all of which are commonly owned, and which are herein incorporated by reference for all purposes.

TECHNICAL FIELD

This invention generally relates to an optical fiber formation process, and more particularly to a method for forming a lensed tip optical fiber.

BACKGROUND

Many applications require the controlled propagation of optical waves like those in planar waveguides, photonic integrated circuits, light sources, such as lasers, and detectors to be coupled into an optical fiber. Still other applications require the coupling of one optical fiber to another optical fiber. Unfortunately, many of these applications are subject to disadvantages and may require a high degree of care in fabrication.

For example, a direct attachment of an optical fiber to the laser can be disrupted, because the operating temperature of the laser will fluctuate and cause different dimensional changes respectively in the fiber and the laser. The dimensional changes in response to temperature fluctuation will cause the fiber to change position with respect to the laser or become separated from the laser.

Direct coupling is generally inefficient because of a wide disparity in the dimensions of the guided modes in the laser and in the fiber. This inefficiency is generally overcome by the use of a lens or lens group to focus optical emission from a laser into an optical fiber.

However, optical coupling is subject to further disadvantages arising from the use of the lens or lens group. For example, it is difficult to achieve precision optical alignment of the lens and the laser. The fiber can become misaligned due to dimensional changes and mechanical drifts with environmental temperature fluctuations over time. Consequently, there is a need for an improved method of optical fiber formation, which can improve optical fiber coupling.

SUMMARY

The present invention provides an economical method for manufacturing an optical fiber including a lens formed on at least one end of the optical fiber.

The at least one end of the optical fiber is modified, for example, using a material removal process to form a pointed end or "tipped end." The tipped end is further processed in accordance with the present invention to create a focal length controllable integrated lens at the tip. The lensed tip optical fiber made by the process of the present invention makes optical alignment with other optical fibers and coupling of the optical fiber with photonic devices, such as light sources, planar waveguides and photonic integrated circuits, less burdensome.

In one aspect of the invention, a method is provided for manufacturing an optical fiber member. The method includes modifying at least one end of an optical fiber member; and applying energy to the modified end of the optical fiber member to form a lens surface.

In another aspect of the present invention, a method is provided for manufacturing a lensed tip optical fiber. The method includes providing an optically transparent cylindrical fiber; and etching a first end of the optically transparent cylindrical fiber to form a tip. The tip is heated which forms a lens surface at the heated tip.

In yet another aspect of the present invention, an optical fiber is provided, which includes a first lens surface formed on a first end of an optically transparent cylindrical fiber. The lens surface is formed by: modifying at least one end of the optically transparent cylindrical fiber; and applying energy to the modified end of the optically transparent cylindrical fiber.

The method of forming the lensed tip optical fiber of the present invention provides for controllable radius or focal length of the lens at the tip at an economical price. The lensed tip optical fiber provides for easier optical alignment with other optical fibers or various discrete and integrated photonic devices, such as light sources, planar waveguides and photonic integrated circuits. Because each optical fiber includes a "built-in" lens, individual lenses can be removed from most optical fiber packages. The removal of individual lenses reduces the number of components required and removes the possibility of misalignment between multiple lenses or lens groups, which are problems associated with typical optical packages. The reduction of the number of components creates a simpler optical package, reduces expensive packaging related labor costs typically associated with optical component packaging and manufacturing processes, and allows the optical package to be made smaller in size. Smaller size means more convenient implementation in compact system designs as well as lower cost.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
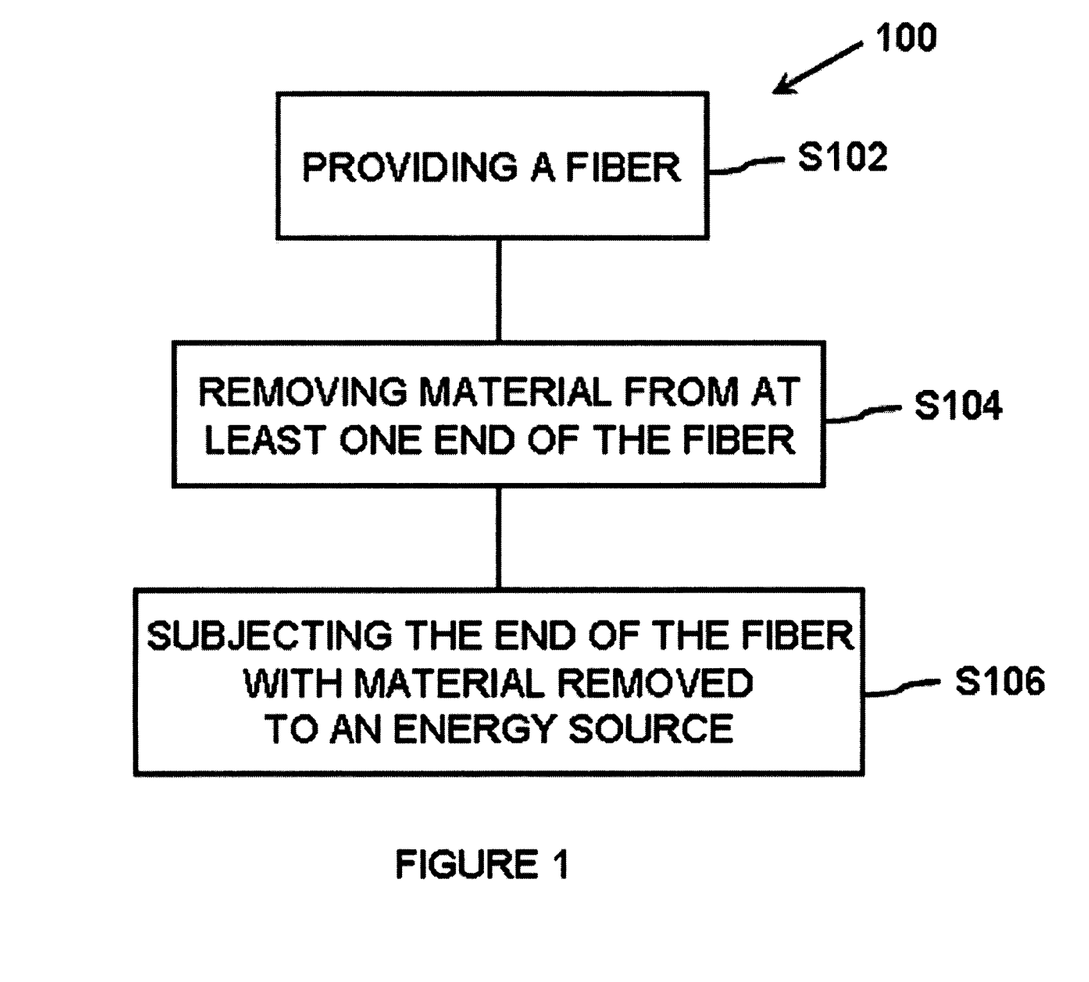
FIG. 1 is a flowchart illustrating a process of the present invention.

FIG. 1 is a flowchart illustrating a process 100 for forming a lensed tip on an optical fiber in accordance with an embodiment of the present invention. Process 100 can include providing a single or a bundle of cylindrical members (s102), such as cylindrical rods or fibers made of glass ($SiO_2$), plastic and the like.

A first end of each cylindrical member can be modified by removing material to form etched ends, modified ends or tips (s104). In one embodiment, the tips are formed by subjecting each end of the cylindrical members to a reactive liquid, in the form of a liquid bath or a liquid spray. In one embodiment, at least one end of a cylindrical member is at least partially immersed into the liquid bath, which includes a material removal or etching liquid. In another embodiment, a suitable material removal or etching liquid is sprayed on at least one end of a cylindrical member. As described in greater detail below, the etching liquid etches or modifies each member segment by removing material therefrom, generally first from the periphery of each member segment. The removal of material from the periphery generally forms a tip at the end of the cylindrical member.

In one embodiment, the second end of each cylindrical member can also be subjected to a reactive liquid, in the form of a liquid bath or a liquid spray. The second end of the cylindrical member is at least partially immersed into the liquid bath, which includes the etching liquid. In an alternative embodiment, a suitable etching liquid is sprayed on the second end of the cylindrical member. The removal of material forms a tip at the second end of the cylindrical member.

In one embodiment, the tipped end or ends of the cylindrical member can be subjected to an energy source, which causes the tipped end to be heated (s106). As described in greater detail below, heating the tipped end causes lens surfaces to be formed on the tipped ends.

Figure 2:
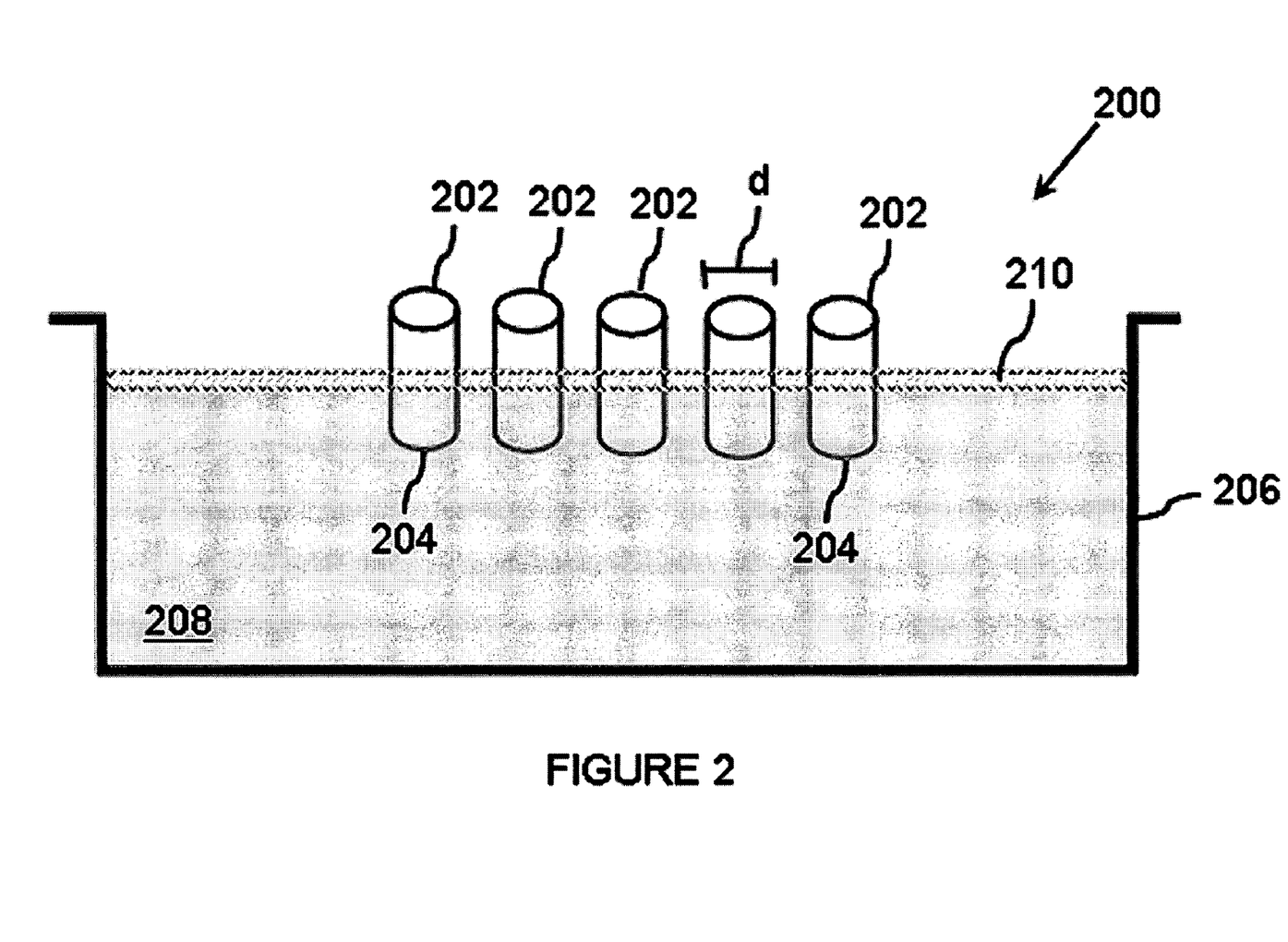
FIG. 2 is a simplified illustration of a liquid bath in accordance with an embodiment of the present invention.

FIG. 2 is a simplified illustration of an etching bath including cylindrical members 202 in accordance with an embodiment of the present invention. In one embodiment, each cylindrical member 202 can be a rod, cylinder, fiber or other similarly shaped member. Alternatively, the cylindrical member can have or be pre-modified to a non-circular cross-section, for example, a square, a rectangular or other polygonal cross-section which may be more suitable for applications in some planar waveguides, optoelectronic and photonic devices.

The diameter and length of each cylindrical member 202 are generally dictated by the application. In one embodiment, the diameter d of each cylindrical member 202 can be that of a standard single mode fiber, which has a typical core size of about 9 µm and an overall diameter of about 125 µm. In general, the diameter d of each cylindrical member 202 can range from between about less than 100 µm and about several millimeters depending on the application. In another embodiment, cylindrical member 202 can be a multi-mode fiber.

In one embodiment, end 204 of cylindrical member 202 may be modified by having material removed, for example, using an etching process in accordance with an embodiment of the present invention.

Referring again to FIG. 2, in one embodiment, the modification of end 204 can be accomplished by placing end 204 into a liquid bath 206.

Liquid bath 206 can include any desired formulation of chemicals suited for removing material from fibers. In one embodiment, liquid bath 206 includes an HF acid 208. A thin layer of oil can be added to liquid bath 206, which forms an oil film 210 on the surface of HF acid 208. The addition of oil film 210 on the surface of the HF acid 208 creates a barrier on the acid surface to control the depth of the etching process. Generally, the depth of the etch is controlled by the depth of the immersion of end 204, however, the HF acid can in some instances "climb up" the members passed that portion which is immersed in the HF acid, causing unwanted etching of the non-immersed portions. Oil film 210 acts as an etch stop and prevents the HF acid from being able to climb beyond oil film 210.

End 204 is placed in liquid bath 206 for a specific duration of time long enough to perform the desired amount of material removal. The time desired for material removal is a function of the material composition of each member 202 and the composition and concentration of liquid bath 206.

Figure 3:
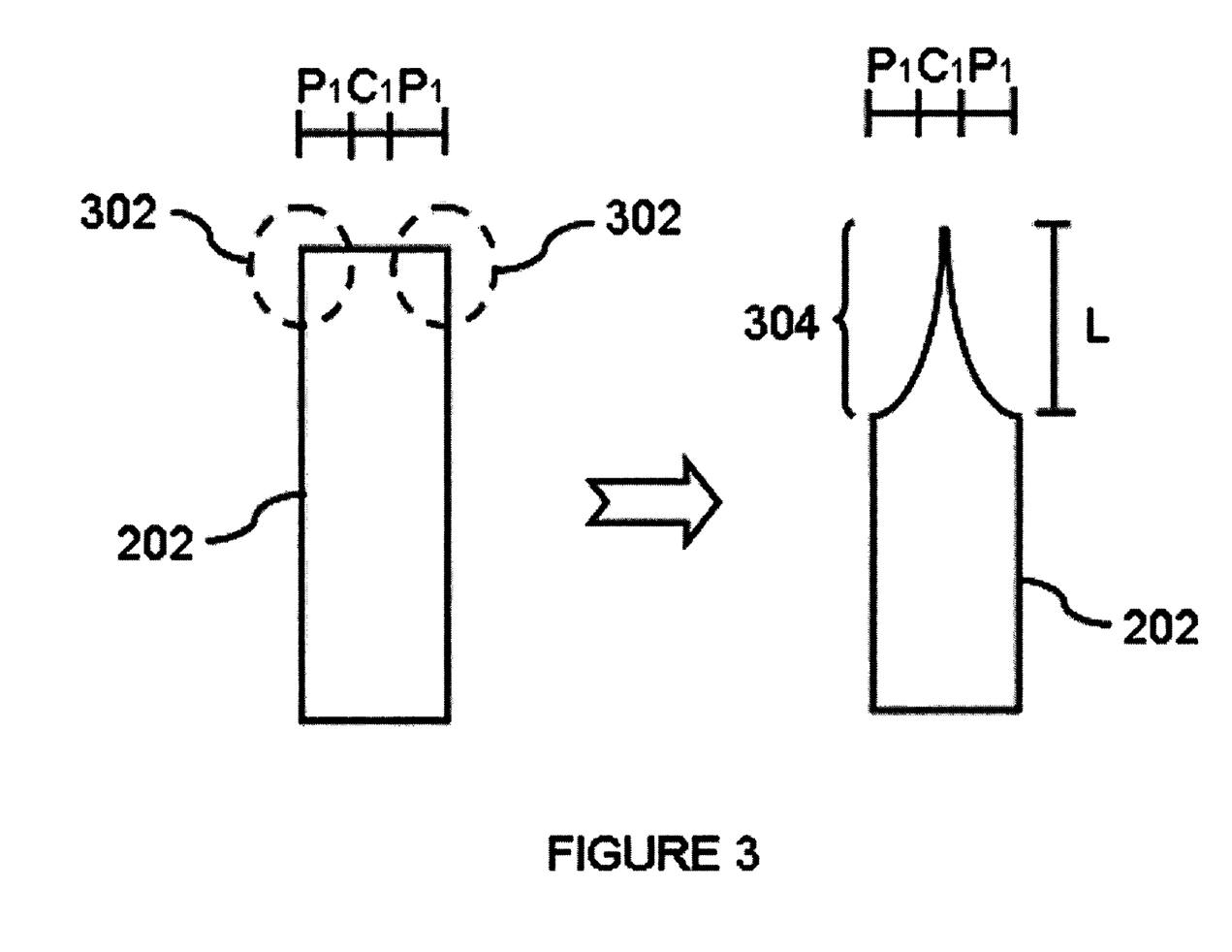
FIG. 3 is a simplified illustration of the formation of a modified end at an end of a cylindrical member in accordance with an embodiment of the present invention.

In one embodiment, shown in FIG. 3, each cylindrical member 202 includes a core area $C_1$ and a peripheral area $P_1$ surrounding core area $C_1$. In operation, liquid bath 208 affects peripheral area $P_1$ before it affects core area $C_1$, since the peripheral area $P_1$ is in direct contact and has more exposed surface area to HF acid 208. This is especially true at the corner areas 302, since the top and side of the corner areas are simultaneously exposed. The type of fiber being used also can affect how the tip area is formed. The core area $C_1$ of some fibers is made more pure than the peripheral area $P_1$—the less pure area is more susceptible to material removal by the liquid.

The length L of modified end 304 is controlled, for example, by the depth of immersion of member 202 into HF acid 208 below oil film 210. The sharpness (or slope) S of modified end 304, however, is controlled by the length of time that member 202 is held in liquid bath 206 and the concentration of HF acid 208.

Beneficially, the material removal process of the present invention is a slow process. Accordingly, the manufacturer can continually check the progress of the material removal process, and can remove end 204 from liquid bath 206 at any time that the desired size of end portion 304 has been arrived at.

Figure 4A:
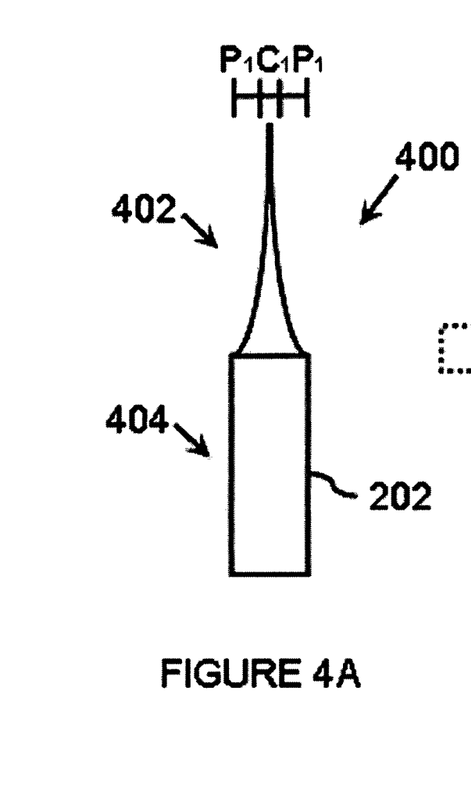
FIG. 4A is a simplified illustration of a structure resulting from the material removal process in accordance with an embodiment of the present invention.

The structure resulting from the material removal process is tipped member 400 as shown in FIG. 4A.

As shown in FIG. 4A, tipped member 400 includes at least one tipped end 402 and a base portion 404. In one embodiment, shown in FIG. 4B, tipped end 402 can be subjected to an energy source 410, which causes tipped end 402 to be heated. The heat treatment causes both the core area $C_1$ and the outer periphery $P_1$ of tipped end 402 to melt. The surface tension created by the melting effect causes curved surfaces to form at the ends of the member segment producing lens surfaces 408. The position of the heating and the amount of energy applied to tipped end 402 determines the physical shape and radius of lens surface 408, and thus the focal length of lens surface 408 formed at tipped end 402.

Figure 4B:
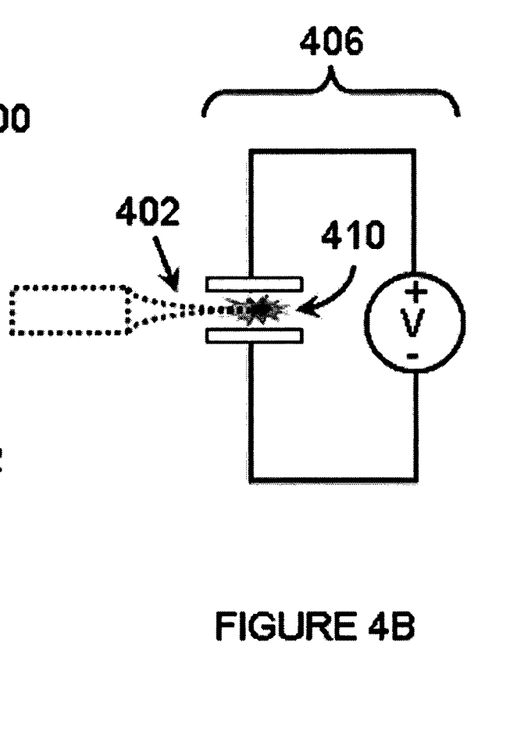
FIG. 4B is a simplified illustration of a process for forming a lens on the modified end of the structure of FIG. 4A in accordance with an embodiment of the present invention.

The method for supplying the required energy for tipped lens formation can be accomplished using any suitable energy generation means including heat (i.e. flame), electrical spark and electrical arcing and equivalents of the embodiment described below.

Referring again to FIG. 4B, in one embodiment, tipped end 402 of tipped member 400 can be placed into an arc generation device 406, such as a commercially available splicing tool. Arc generation device 406 is capable of providing an arc or spark which allows for the heat treatment to be accomplished for any given optically transparent member material. The heat treatment causes the formation of lens surfaces 408 in the manner described above.

In other embodiments, energy source 410 which provides heating can be a glow discharge placed near tipped end 402 or a high powered laser using a wavelength that can be absorbed by the material of tipped end 402 to heat the material and form lens surfaces 408 in accordance with the present invention.

Figure 4C:
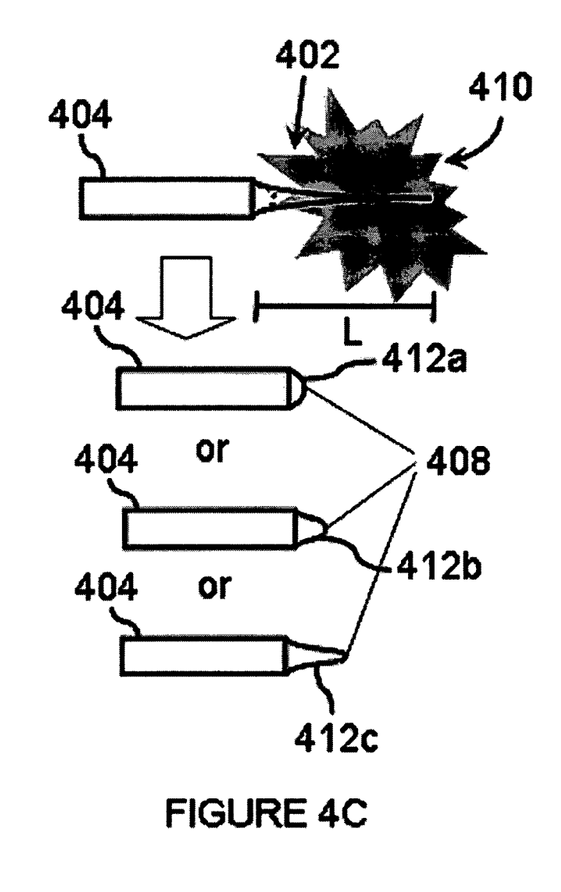
FIG. 4C includes simplified illustrations of focal length controllable lens surfaces that can be formed on the modified end of the structure of FIG. 4A in accordance with an embodiment of the present invention.

FIG. 4C includes side views of single optically transparent tipped members 402 after the heating process in accordance with an embodiment of the present invention. Tipped end 304 can be modified by the heating process to have different radii of curvature in two mutually perpendicular or other different directions. The particular illustrations in FIG. 4C show curved surfaces 412a, 412b and 412c, such as an oval, semi-oval, plano/convex asphere and the like formed at different positions on tipped end 402, which can provide different optical performance in different optical axes relative to the major axis of lens surfaces 408.

The positioning of lens surface 408 on tipped end 402 is a function of the depth of energy application or heating along the length L of tipped end 402 and the length of time of exposure to the energy source. In one embodiment, tipped end 402 has a length L. The application of energy is provided at a location along length L to form lens surface 408 at that location on the tipped end 402. In one embodiment, the location along length L where lens surface 408 is formed can have an angle or slope of between about 15° to about 20°, which is especially useful for applications in optical fiber or waveguide coupling and packaging.

The curvature and size of lens surfaces 408 can be adjusted based on the requirements of the particular application. Manufacturing specifications and tolerances for lens surfaces 408 are governed by the specific application and defined by the end user accordingly.

Figure 5:
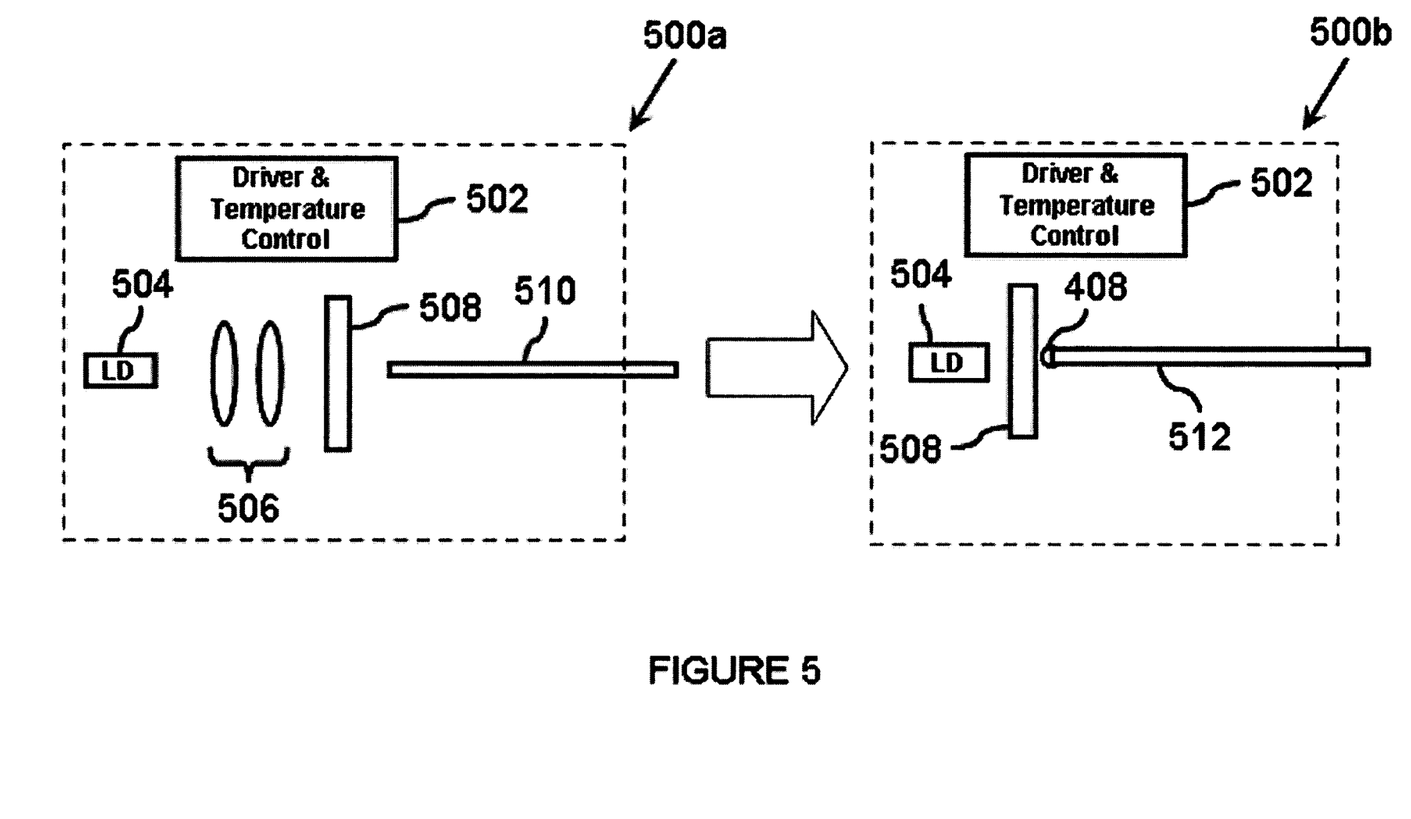
FIG. 5 is a simplified illustration of an application for the present invention in accordance with an embodiment of the present invention.

FIG. 5 is a simplified illustration of an application for the present invention in accordance with an embodiment of the present invention. In this exemplary application, a standard optical package 500a is compared to a new package 500b, which includes the lensed tip optical fiber of the present invention. The standard optical package 500a includes a laser module. The laser module includes driver and environmental temperature controls 502, a laser 504, a lens group 506, isolation device 508, and a standard optical fiber 510. Lens group 506 collects light from laser 504 and directs and focuses the light to optical fiber 510. The multiple components involved must be properly aligned and fixed in place. The alignment of the different components requires each component to be adjustable while at the same time the properly aligned components need to be precisely fixed in positions. In practice, a compromise must be reached in order for those components to be adjustable and also fixed in place without drifting away from the aligned positions. Accordingly, the optimum alignment can never be achieved in traditional package 500a and thus, much of the light from laser 504 is not directed into optical fiber 510.

The new optical package 500b also includes a laser module having driver and environmental temperature controls 502, a laser 504, and isolation device 508. However, in this exemplary embodiment, lens group 506 is removed and standard optical fiber 510 is beneficially replaced with lensed tip optical fiber 512 made in accordance with the process of the present invention. Focal length and shape controlled lensed tip optical fiber 512 includes lens surface 408, which can be placed close to the output facet of laser 504 to efficiently collect most of the light from laser 504 and direct it through optical fiber 512. Experimental tests suggest an optical coupling efficiency as high as 80% is achievable using lensed tip optical fiber 512, which is manufactured in accordance with an embodiment of the present invention.

Figure 6:
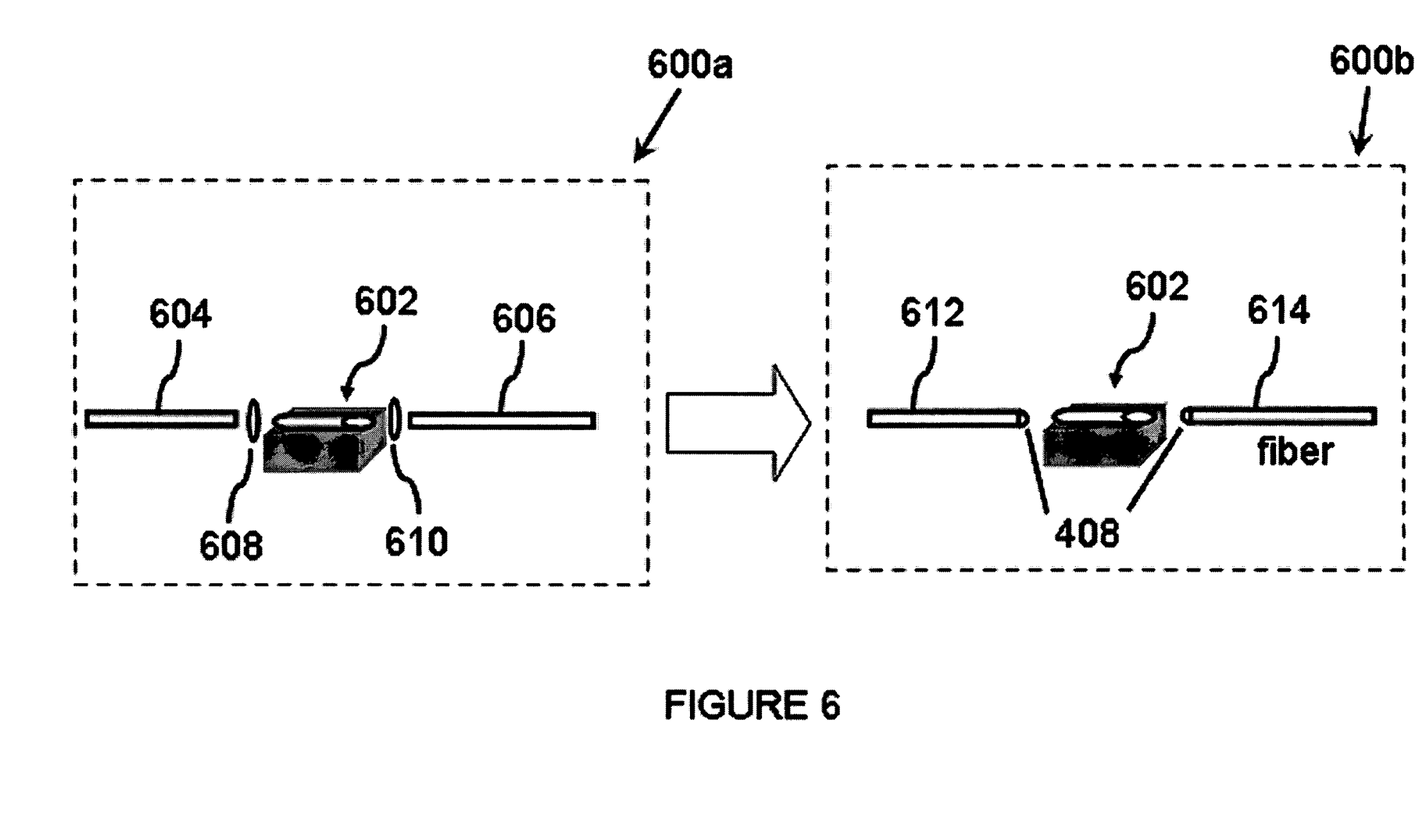
FIG. 6 is a simplified illustration of another application for the present invention in accordance with an embodiment of the present invention.

FIG. 6 is a simplified illustration of another application for the present invention in accordance with an embodiment of the present invention. In this exemplary application, a standard optical package 600a is compared to a new package 600b, which includes the lensed tip optical fiber of the present invention. The standard optical package 600a includes an optical component 602 between two standard optical fibers 604 and 606. To properly align the standard fibers 604 and 606, lenses 608 and 610 are positioned between optical component 602 and each standard optical fiber 604 and 606. Lens 608 collects light from the input optical fiber 604 and focuses the light onto the input waveguide of optical component 602. Lens 610 on the output side of the optical component picks up light from the output waveguide of optical component 602 and re-focuses it into optical fiber 606. The alignment of lenses 608 and 610 with the optical component 602 and the two optical fibers 604 and 606 requires all components to be adjustable for optimization, while optimized alignment requires all components to be precisely fixed in place, which is never achievable in practice.

The new optical package 600b also includes optical component 602. However, in this embodiment, lensed tip optical fibers 612 and 614 are used to replace standard fibers 604 and 606. Since lensed tip optical fibers 612 and 614 include lens surfaces 408, they are automatically aligned to the optical fibers 612 and 614, eliminating the need for multiple adjustable fixtures for the lenses and complicated package designs. The new optical package 600b simplifies the packaging design and optical alignment process and, at the same time, improves the reliability of the optical package. In addition, properly designed and controlled lensed tip fibers can increase the optical coupling efficiency and minimize the size of the optical package.

The lensed tip optical fiber of the present invention can be used in numerous other applications. For example, the lensed tip optical fiber of the present invention can be used in hermetic sealed pigtail alignment/welding applications. The lens tips can be formed on fiber ribbons for better coupling or interconnection capability in various dense wavelength division multiplexing (DWDM) components, optoelectronic, photonic components and photonic integrated circuits and, can be used for focusing incoming light to detectors to create higher efficiency receivers. The lensed tip optical fiber can also be used for laser surgical tools in various medical fields and portable sensors as micro-imaging, bioprobes, spectral analysis and the like.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method for manufacturing an optical fiber member comprising:

modifying at least one end of an optical fiber member to form an end continuously tapered to the outer circumference of the optical fiber member; and applying energy to the modified end of the optical fiber member to form a lens surface with a desired focal length, wherein the lens surface continuously tapers outward to the outer circumference of the optical fiber member, wherein said modifying comprises removing material from said at least one end of the optical fiber member.

2. The method of claim 1, wherein said modifying comprises etching said at least one end of said optical fiber member by subjecting said at least one end of said optical fiber member to an etching liquid.

3. The method of claim 2, wherein said etching liquid comprises HF acid.

4. The method of claim 2, wherein the etching liquid comprises an oil on the top surface of the etching liquid.

5. The method of claim 1, wherein said optical fiber member comprises a material taken from the group consisting of glass, polymer and plastics.

6. The method of claim 1, wherein said applying energy to the modified end comprises heating said modified end to form said lens surface.

7. The method of claim 6, wherein said lens surface comprises a convex, concave or planer lens surface.

8. The method of claim 6, wherein said heating comprises heating both ends to form a lens surface on each end.

9. The method of claim 1, wherein said modifying comprises removing material from both ends of the optical fiber member.

10. The method of claim 1, wherein said modified end has a first length, and wherein said applying energy comprises applying energy at a location along said length to form said lens surface at a position on the modified end having an angle of between about 15° to about 20°.

11. The method of claim 1, wherein said applying energy comprises exposing said modified end to a heat source.

12. The method of claim 1, wherein said applying energy comprises moving said modified end to a spark.

13. A method for manufacturing a lensed tip optical fiber comprising:

providing an optically transparent cylindrical fiber;

etching a first end of said optically transparent cylindrical fiber to form a tip continuously tapered to an outer surface of the fiber; and heating said tip to form a lens surface with a desired focal length, wherein the lens surface continuously tapers outward to the outer surface of the fiber.

14. The method of claim 13, wherein said optically transparent cylindrical fiber comprises a material taken from the group consisting of glass, polymer and plastics.

15. The method of claim 13, wherein said etching comprises etching said optically transparent cylindrical fiber by subjecting said first end of said optically transparent cylindrical fiber to an etching liquid.

16. The method of claim 15, wherein said etching liquid comprises HF acid.

17. The method of claim 15, wherein the etching liquid comprises an oil on the top surface of the etching liquid.

18. The method of claim 13, wherein said lens surface comprises a convex, concave or planer lens surface.

19. The method of claim 13, wherein said etching comprises etching said first end and a second end of the optically transparent cylindrical fiber.

20. The method of claim 19, wherein said heating comprises heating both said first end and said second end to form a lens surface on each end.

21. An optical fiber comprising:

a first lens surface formed on a first end of an optically transparent cylindrical fiber, said first lens surface formed by:

modifying at least one end of said optically transparent cylindrical fiber to form an end continuously tapered to the outer circumference of the fiber, wherein said modifying comprises removing material from said at least one end of the optical fiber member; and applying energy to the modified end of the optically transparent cylindrical fiber to form the first lens surface with a desired focal length, wherein the first lens surface continuously tapers outward to the outer circumference of the fiber.

* * * * *